US012646865B2

(12) United States Patent
Lawson et al.

(10) Patent No.: US 12,646,865 B2
(45) Date of Patent: Jun. 2, 2026

(54) ELECTRICAL TERMINAL AND ASSEMBLY

(71) Applicant: Hubbell Incorporated, Shelton, CT (US)

(72) Inventors: Craig Lawson, Milford, OH (US); Eric Miller, West Chester, OH (US)

(73) Assignee: HUBBELL INCORPORATED, Shelton, CT (US)

( * ) Notice: Subject to any disclaimer, the term of this patent is extended or adjusted under 35 U.S.C. 154(b) by 411 days.

(21) Appl. No.: 18/352,045

(22) Filed: Jul. 13, 2023

(65) Prior Publication Data

US 2024/0022009 A1 Jan. 18, 2024

Related U.S. Application Data

(60) Provisional application No. 63/389,675, filed on Jul. 15, 2022.

(51) Int. Cl.
*H01R 4/36* (2006.01)
*H01R 4/32* (2006.01)

(52) U.S. Cl.
CPC ................. *H01R 4/36* (2013.01); *H01R 4/32* (2013.01)

(58) Field of Classification Search
CPC ........................................................ H01R 4/36
See application file for complete search history.

(56) References Cited

U.S. PATENT DOCUMENTS 3,957,733 A * 5/1976 Rogier .................. C08G 69/26 524/602
4,488,770 A 12/1984 Lui et al.
5,030,131 A * 7/1991 Boehm .................... H01R 4/36 439/810
6,338,658 B1 * 1/2002 Sweeney .................. H01R 4/36 439/810
7,445,527 B1 * 11/2008 Carr ......................... H01R 4/36 439/814
10,630,005 B1 * 4/2020 Ridley ..................... H01R 4/20
2016/0036141 A1 * 2/2016 Lawson ................. H01R 11/12 439/784
2016/0322715 A1 11/2016 Beiler et al.
2019/0115674 A1 * 4/2019 Lefavour ................. H01R 9/18
2022/0094080 A1 3/2022 Ruland

OTHER PUBLICATIONS

International Search Report dated Nov. 8, 2023, which issued in the corresponding PCT Patent Application No. PCT/US23/27743.

* cited by examiner

*Primary Examiner* — Tulsidas C Patel
*Assistant Examiner* — Jeffrey Mountain
(74) *Attorney, Agent, or Firm* — Dickinson Wright, PLLC

(57) ABSTRACT

An electrical terminal includes a body with a first opening for receiving an electrical conductor and a second opening for coupling the electrical terminal to an electrically conducting member. The second opening has a first open portion with an inner dimension to receive a first fastener and a second open portion with an inner dimension different than the first open portion. The second open portion is configured to receive a second fastener having an outer dimension different than the first fastener. The second open portion can have a substantially circular first and second open portions that overlap along the outer edges. An electrical assembly includes the electrical terminal and an electrically conducting base, and either a first fastener having a first dimension or a second fastener having a second dimension, where the dimension of the fasteners corresponding to dimension of a threaded hole in the base.

20 Claims, 4 Drawing Sheets

ELECTRICAL TERMINAL AND ASSEMBLY

This application claims priority to U.S. Provisional Patent Application No. 63/389,675 filed on Jul. 15, 2022, which is hereby incorporated by reference in its entirety.

FIELD OF THE INVENTION

The present invention relates to an electrical terminal to provide an electrical connection to an electrically conducting member. The invention is further directed to an electrical assembly to provide an electrical connection between an electrical conductor and an electrically conducting member or for providing a ground connection to a grounded base.

BACKGROUND

Electrical connectors and terminals are used for connecting an electrical conductor, such as a wire, to an electrically conducting base or support. The electrical terminal is typically attached to the base or support to provide an electrical connection between the terminal and the base or support. The terminal includes a coupling to connect a wire or conductor to the terminal to form an electrical connection between the wire and the base or support.

Electrical terminals are often constructed for coupling to a base having a predetermined shape and size. The electrical terminals are generally not interchangeable with different size screws or fasteners.

While the prior devices have been suitable for the intended purpose, there is a continuing need in the industry for improved mechanisms for providing electrical connection to an electrically conducting member.

SUMMARY

The device described herein relates to an electrical terminal or electrical connector for providing an electrical connection between a wire or electrical conductor and electrically conducting base, support or other structure. The base or support can be an electrical device or component of an electrical device. The electrical terminal also can be used for connecting a ground wire to a suitable electrically grounded structure.

The electrical terminal as described is configured to provide an electrical connection to carry a current or to provide a grounding connection between components. The electrical terminal is constructed to be attached to a base or support and to receive an electrical conductor, such as an electrical wire or cable for electrically connecting the electrical conductor to the base or support.

The electrical terminal in one embodiment has a body configured to receive an electrical connector, such as an electrical wire. A suitable fastener can be provided to couple the electrical connector to the body. The body includes a screw hole for connecting the body to the base or support. The screw hole is configured to receive different size or different diameter screws to accommodate a threaded screw hole in the base or support.

The screw opening for coupling the electrical terminal to the base or support is able to receive different size screws or other fasteners while enabling a secure coupling between the screw and the base. The electrical terminal can have a single screw opening or more than one screw opening where each screw opening is configured to accept at least two different diameter screws or fasteners. The opening or openings can have a first open portion and a second open portion where each open portion has a different inner dimension to accommodate different diameter fasteners. The first open portion and the second open portion can be oriented to form an open gap between the first open portion and the second open portion. The electrical terminal is a universal device to accommodate different size and different diameter screws that correspond to a predetermined size screw hole in the base or other support.

In one embodiment, the perimeter of the first open portion and the second open portion of the opening overlap with each other so that the first open portion is in communication with and open to the second open portion. The inner surfaces of the first open portion and the second open portion have a substantially circular shape.

The screw opening for receiving the screw or other fastener can have at least one projection extending inwardly from an inner edge of the opening to separate the first open portion and the second open portion. In one embodiment, two opposing projections can be provided that extend inwardly to define a gap between the projections and between the first open portion and the second open portion. The gap typically has a dimension less than an inner dimension of the first open portion and less than an inner dimension of the second open portion.

The features of the electrical terminal are basically attained by providing a body having a first opening configured for receiving an electrical conductor, and a second opening configured for receiving a fastener for coupling the electrical terminal to an electrically conducing member. The second opening has a first open portion with an internal dimension to receive a first fastener having a first diameter and a second open portion with an inner dimension different than the inner dimension of the first open portion. The second open portion is configured to receive a second fastener having a second diameter different than the first diameter of the first fastener.

The features of the electrical terminal are further attained by providing a body having a connector configured for coupling to an electrical conductor. The body has a first open portion configured for receiving a first fastener for connecting the body to an electrically conducting member, and a second open portion configured for receiving a second fastener. The second open portion has an inner dimension greater than an inner dimension of the first open portion. The second fastener has an outer diameter greater than an outer diameter of the first fastener.

The features of the invention are further attained by providing an electrical assembly comprising an electrically conductive member and an electrical terminal. The electrical terminal has a body with a hole with a first open portion with a first inner dimension to receive a first threaded fastener having a first outer diameter and a second open portion with a second inner dimension greater than the first inner dimension to receive a second threaded fastener having a second outer diameter greater than the first outer diameter of the first threaded fastener. The electrical terminal is coupled to the electrically conductive member by one of the first threaded fastener extending through the first open portion and received in a threaded hole having a first dimension complementing the first threaded fastener or a second threaded fastener extending though the second open portion and received in a threaded hole having a dimension complementing the second threaded fastener.

These and other features of the device will become apparent from the following detailed description, which in conjunction with the drawings disclose various embodiments of the device.

BRIEF DESCRIPTION OF THE DRAWINGS

The various aspects and advantages of embodiments of the device will be more readily appreciated from the following detailed description, taken in conjunction with the accompanying drawings, of which.

DETAILED DESCRIPTION OF EMBODIMENTS

Figure 1:
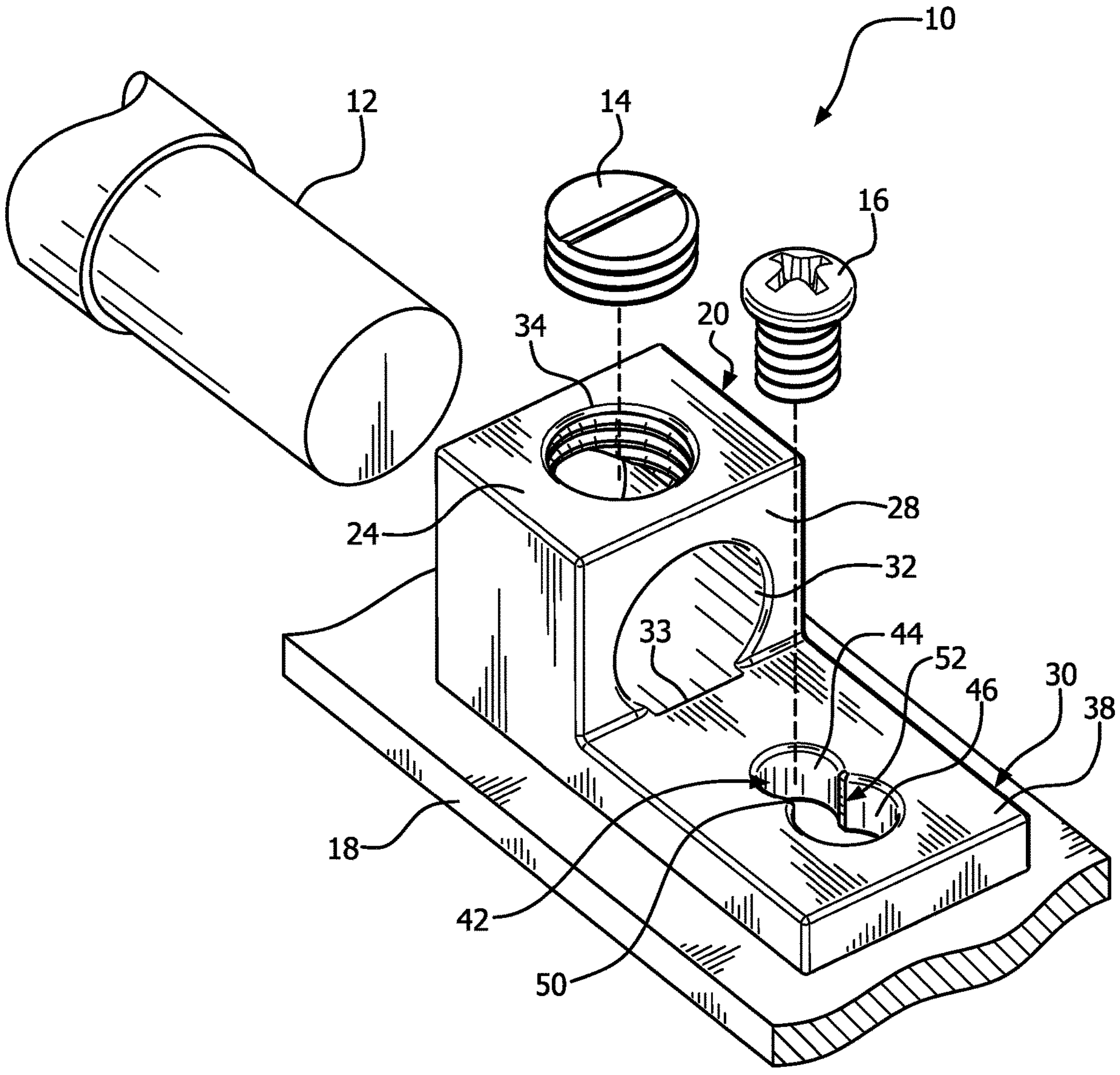
FIG. 1 is a perspective view of the electrical terminal in one embodiment.
Figure 2:
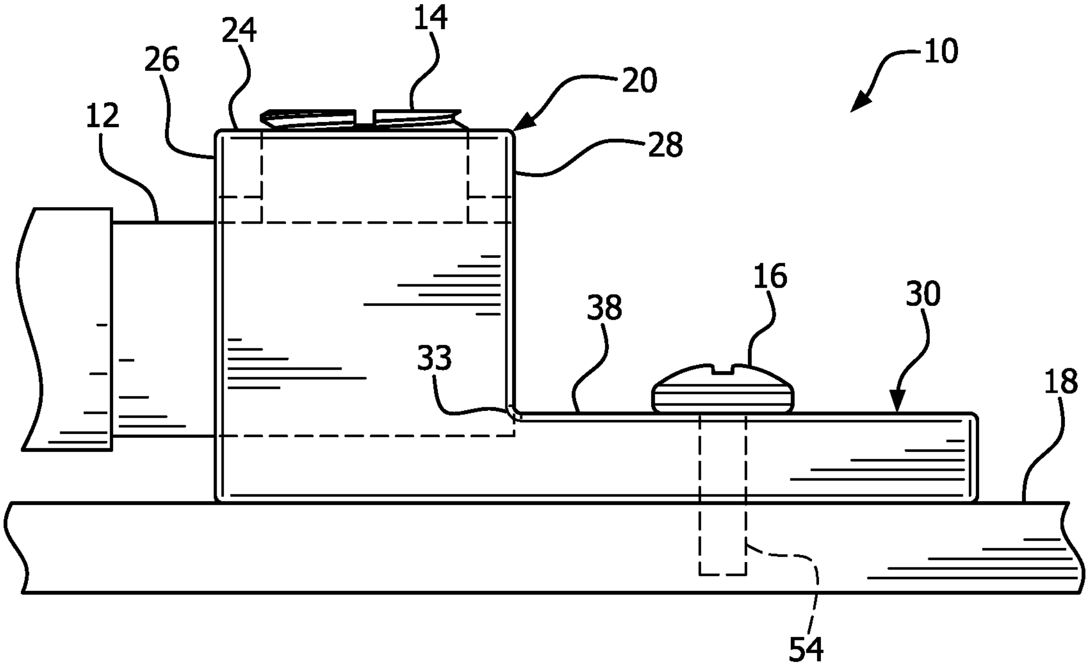
FIG. 2 is a side view of the electrical terminal of FIG. 1.

Reference will now be made in detail to embodiments of the present device, which are illustrated in the accompanying drawings, wherein like reference numerals refer to like elements throughout. The embodiments described herein exemplify, but do not limit, the present device by referring to the drawings.

It will be understood by one skilled in the art that this disclosure is not limited in its application to the details of construction and the arrangement of components set forth in the following description or illustrated in the drawings. The embodiments herein are capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting. Any of the embodiments and/or elements and features disclosed herein may be combined with one another to form various additional embodiments not specifically disclosed, as long as they do not contradict or are not inconsistent with each other. Terms of degree, such as "substantially", "about" and "approximately" are understood by those skilled in the art to refer to reasonable ranges around and including the given value and ranges outside the given value, for example, general tolerances associated with manufacturing, assembly, and use of the embodiments. The term "substantially" when referring to a structure or characteristic includes the characteristic that is mostly or entirely present.

The invention is directed to an electrical terminal and to an electrical terminal assembly including the electrical terminal. Electrical terminals typically have a single screw hole with a predetermined inner diameter to accommodate a specific size fastener, such as a screw. The base or other support structure that receives the electrical terminal typically has specific size screw hole for the fastener to attach the electrical terminal to the base. The base or support structure can have different size screw holes depending on the electrical device being connected. The electrical terminal of the invention is able to receive different size and different diameter screws to accommodate the different size and diameter screw holes in the base or support structure.

FIG. 1 is perspective view of the electrical assembly that includes the electrical terminal 10 in one embodiment. The electrical assembly in the embodiment shown includes the electrical terminal 10, an electrical conductor 12, a coupling screw 14 for coupling the electrical connector 12 to the electrical terminal 10, and a coupling screw 16, and a base 18. The coupling screw 16 is provided for coupling the electrical terminal 10 to the base 18.

The base 18 is an electrically conducting member for supporting the electrical terminal 10. The base 18 can be a support for the electrical terminal 10. As described herein, the base 18 refers to a suitable surface that can receive and support the electrical terminal 10. The base can be component or part of an electrical device or structure. The base is typically a metal component or part that is electrically conducting. In other embodiments, the base refers to an electrically conducting surface of a structure.

The electrical terminal 10 in the embodiment shown has a body 20 that is formed as a one-piece, unitary member. The body 20 is made of metal, such as steel, copper, aluminum or other electrically conducting material. In alternative embodiments, the body can be made of multiple pieces that are assembled to form the body. The body 20 can have various suitable shapes and configurations depending on the intended use. In the embodiment shown, the body 20 has bottom face 22 configured to contact a surface of the base 18 and for making an electrical connection between the electrical terminal 10 and the base 18. The bottom face 22 of the body 20 in the embodiment shown is substantially flat. In other embodiments, the bottom face 22 can be shaped to conform to the surface of the base 18. The bottom face 22 can have a textured surface to promote the electrical connection between the body 20 and the base 18. The textured surface can be formed by a plurality of teeth, grooves, ridges, knurled surfaces, and the like.

The body 20 in the embodiment shown has a shape with a top face 24, a first end face 26 and a second end face 28. In the illustrated embodiment, the body 20 can have a substantially square shape although it is understood that the body can have other suitable shapes. As shown in FIG. 1, the body 20 includes a leg 30 extending from the body 20 and forms the bottom face 22 with the body 20

The body 20 includes an opening 32 forming a though passage extending through the body 20 between the first end face 26 and the second end face 28. The opening 32 has a dimension to receive the electrical conductor 12. The body 20 is formed with a connector for connecting with the electrical conductor and securing the electrical conductor to the electrical terminal 10. In the embodiment shown, the top face 24 of the body 20 has a threaded hole 34 for receiving the threaded screw 14 to form the connector of the electrical terminal 10. The threaded screw 14 is received in the threaded hole 34 to contact the electrical conductor 12 received in the opening 32 and to secure or clamp the electrical conductor 12 to the electrical terminal 10. In other embodiments, the threaded screw 14 can be substituted by another fastening mechanism capable to securing and/or clamping the electrical conductor 12 to the electrical terminal 10. The opening 32 and the threaded hole 34 can be provided in different locations and orientations depending on the intended use of the electrical terminal 10.

The leg 30 as shown in the drawings has a substantially flat configuration with a thickness less than the height of the body 20 to simplify the attachment of the electrical terminal 10 to the base 18. The thickness of the leg 30 provides sufficient strength to the leg and to enable attachment of the electrical terminal 10 to the base 18 by a suitable fastener, such as a screw.

The leg 30 as shown in the drawings has an opening 42 extending through the leg between the top face 38 and the bottom face 40 and has a dimension for receiving a fastener for coupling the electrical terminal 10 to the base 10. The opening 42 in the embodiment shown has an inner dimension to accommodate different size fasteners for coupling the electrical terminal 10 to the base. In the embodiment shown, the opening 42 has an internal configuration with different dimensions to accommodate the different size fasteners.

Figure 4:
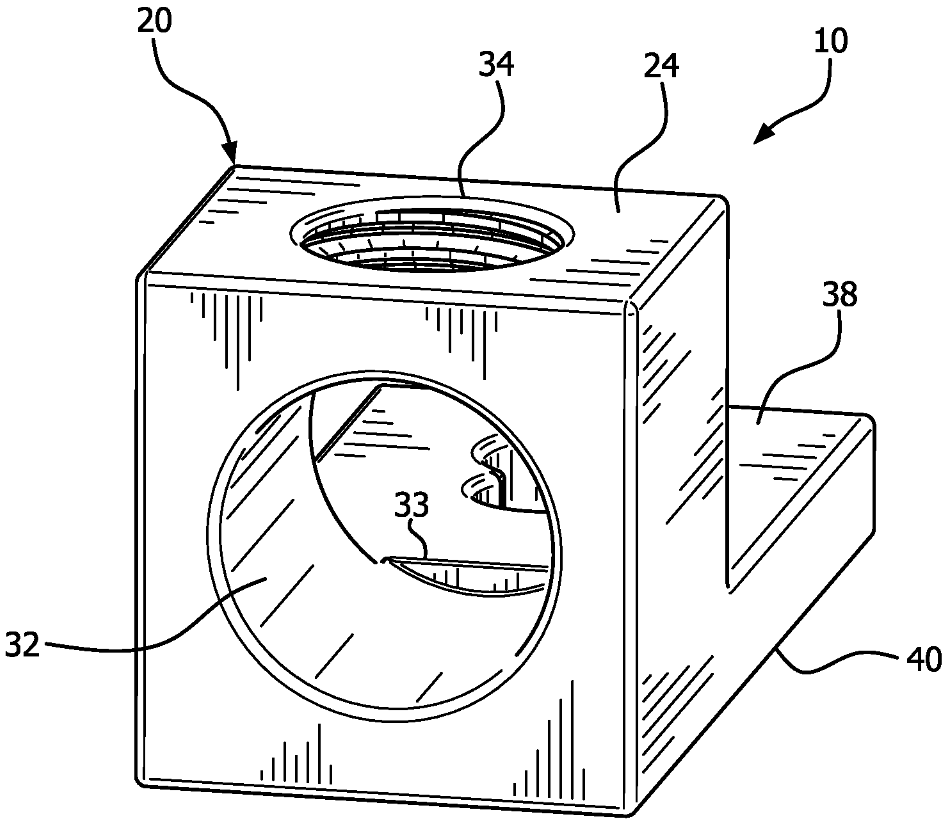
FIG. 4 is a rear view of the electrical terminal of FIG. 1.
Figure 5:
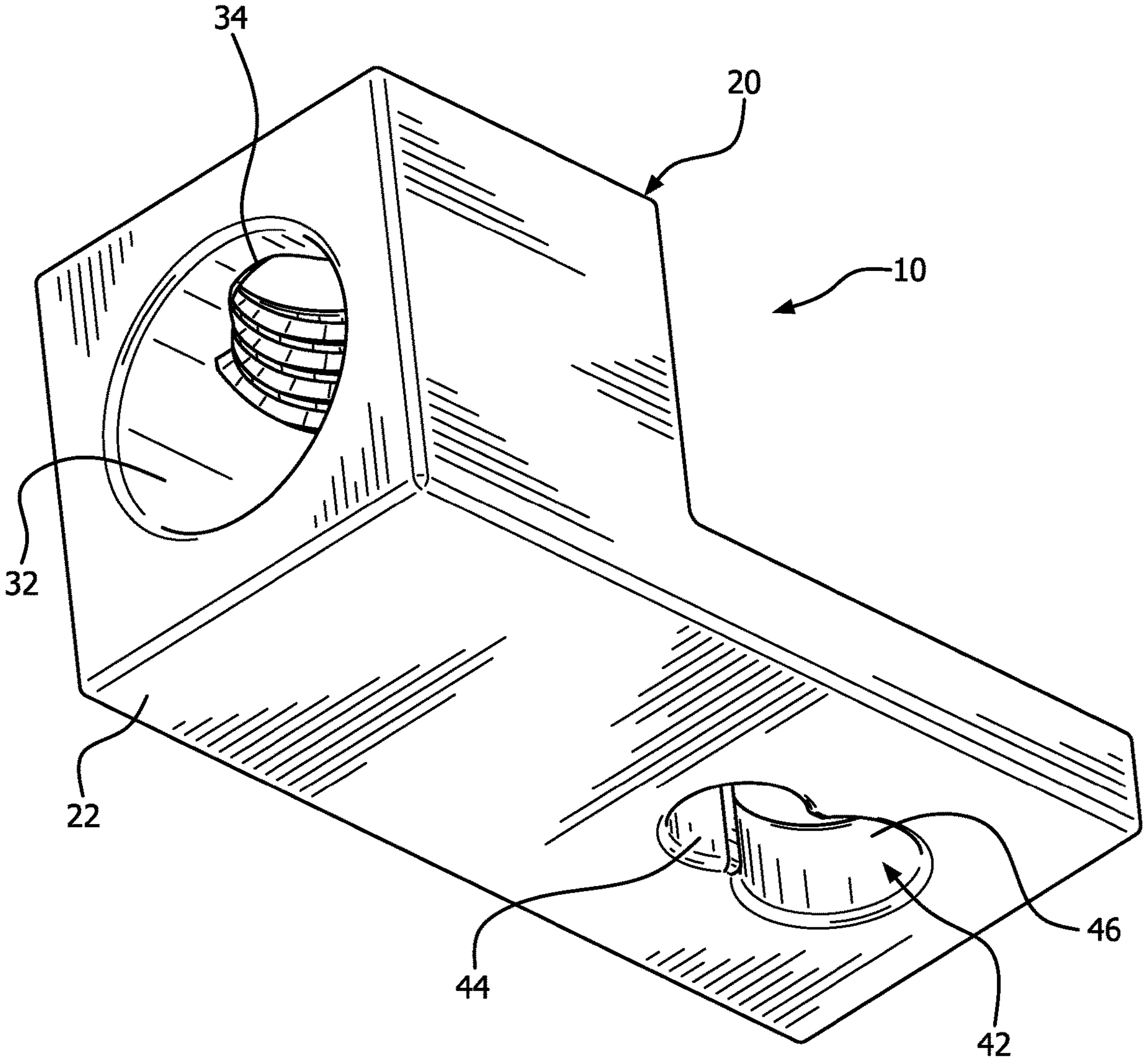
FIG. 5 is a bottom perspective view of the electrical terminal of FIG. 1.

In the embodiment shown, the opening 32 has a circular configuration to receive the electrical conductor 12. The inner diameter of the opening 32 is generally slightly larger than the outer diameter of the electrical conductor 12 to enable the electrical conductor to fit easily within the opening. As shown in FIG. 4, the lower portion of the opening 32 extends below the top surface of the leg 30 to form an end wall or step portion 33. The step portion 33 forms a stop to contact the end of the electrical conductor and prevent the end of the electrical conductor from extending through the opening 32 where the electrical conductor can interfere with the fastener received in the opening 42. The screw 14 has a length to extend into the opening 32 a distance to engage and clamp the electrical conductor.

Figure 3:
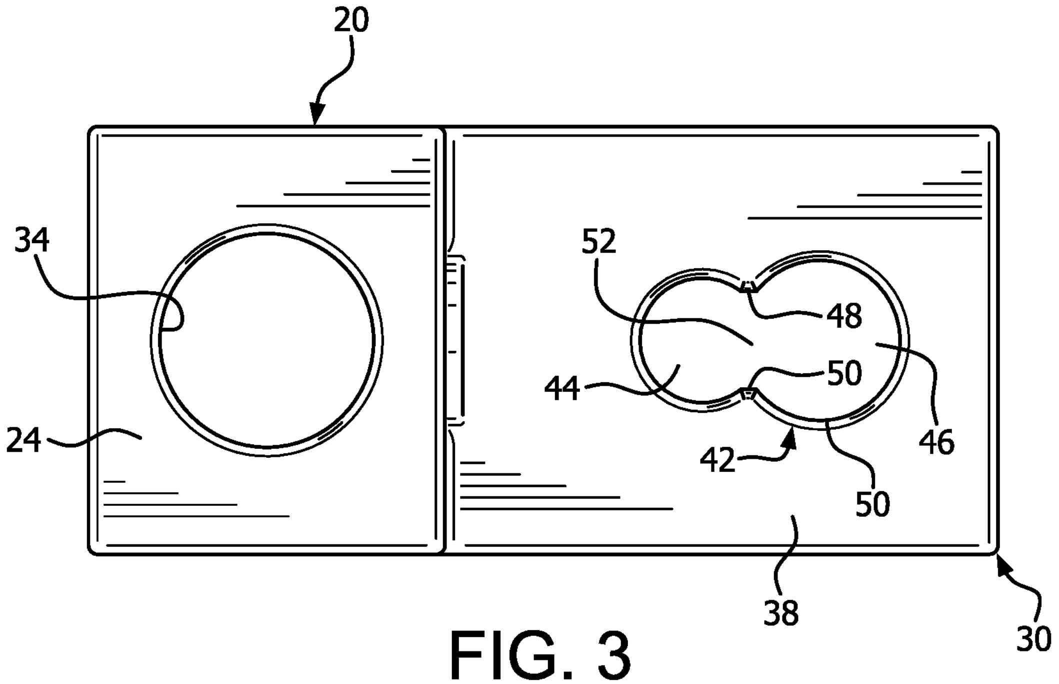
FIG. 3 is a top view of the electrical terminal of FIG. 1.

As shown in FIG. 1 and FIG. 3, the opening 42 has a first open portion 44 with a first inner dimension and inner diameter and a second open portion 46 with a second inner dimension and inner diameter. The open portion 44 and the open portion 46 are shown has having a substantially circular shape to accommodate a fastener having different sizes and diameters, such as a screw or other threaded fastener. In the embodiment shown, the first open portion 44 and the second open portion 46 are oriented to overlap slightly to retain the substantially circular inner shape and inner diameter of the respective opening portions 44 and 46. The overlapping of the open portion 44 and the open portion 46 form a generally key-hole shaped opening. In other embodiments, the first open portion and the second open portions can be separate, spaced-apart holes for receiving screws or fasteners having a different diameter.

The overlapping of the open portion 44 and the open portion 46 form a first projection 48 projecting from a first side of the opening 42 and extending inwardly toward the inner space of the opening 42. A second projection 50 projects inwardly from a second side of the opening 42. As shown, the projections 48 and 50 extend from opposite sides toward each other to form a gap 52 between the ends of the projections 48 and 50. The first open portion 44 has an inner dimension and inner diameter corresponding substantially to the outer dimension and diameter of a first fastener that corresponds to the dimension and diameter of the threaded hole in the base 18. The second open portion 46 has an inner dimension and inner diameter corresponding to the outer dimension and diameter of a second fastener that corresponds to a different inner dimension of a threaded hole in the base 18. The gap 52 typically has a spacing less than the outer dimension of the first fastener and the second fastener to prevent the fastener from sliding between the first open portion and the second open portion. As shown, the gap 52 has width less than the inner dimension of the first open portion and less than an inner dimension of the second open portion.

The base 18 is an electrically conducting member for receiving and supporting the electrical terminal 10. The base 18 as shown has a hole to accommodate a fastener for coupling the electrical terminal 10 to the base. In the embodiment shown, the base 18 has threaded hole 54 having a predetermined inner dimension and diameter for receiving a predetermined size and diameter threaded fastener shown as a screw 16. The inner dimension and diameter of the threaded hole 54 can be determined by the needs and intended use of the device. The outer dimension and diameter of the threaded fastener corresponds generally to either the inner dimension of the first open portion 44 or the inner dimension of the second open portion 46 depending on the outer diameter of the threaded fastener 16. In this manner the electrical terminal 10 is able to be coupled to the base 18 by different size threaded fasteners depending on the inner dimension and diameter of the threaded hole 54.

The electrical terminal 10 as described is able to attach to a different base 18 having a threaded hole 54 with a different inner dimension. The first open portion 44 of the opening 42 is able to accommodate a threaded fastener having a first size and diameter while the second open portion 46 is able to accommodate a threaded fastener having a second size and diameter. The configuration of the opening 42 allows the electrical terminal 10 to accommodate different size and diameter fasteners and avoids the need to produce different electrical terminals with different size and diameter screw holes in the respective base.

The electrical terminal 10 can be used in a method for coupling the electrical terminal to a base. The electrical terminal 10 is as described above. The base 18 can have a threaded hole 54 of a predetermined size and diameter. The user selects the threaded fastener 56 according to the inner dimension of the threaded hole 54. Preferably the threaded fastener 16 has a dimension complementing the inner dimension of either the first open portion 44 or the second open portion 46. The selected threaded fastener 16 is inserted through the first open portion or the second open portion of the opening 42 depending on the size of the threaded fastener 56 and the diameter of the threaded hole 54 in the base 18. The threaded fastener can then be threaded into the hole to attach the electrical terminal to the base.

Although only a few embodiments of the present device are shown and described, the present device is not limited to the described embodiments. Instead, it will be appreciated by those skilled in the art that changes may be made to these embodiments without departing from the principles and spirit of the device. Different embodiments can be combined with other embodiments as long as they are not inconsistent with each other. It is particularly noted that those skilled in the art can readily combine the various technical aspects of the various elements of the various exemplary embodiments that have been described above in numerous other ways, all of which are considered to be within the scope of the disclosure and equivalents thereof.

The invention claimed is:

1. An electrical terminal comprising:

a body having a first opening configured for receiving an electrical conductor, and a second opening configured for receiving a fastener for coupling said electrical terminal to an electrically conducting member, said second opening having a first open portion with an inner dimension to receive a first fastener having a first diameter and a second open portion with an inner dimension different than the inner dimension of said first open portion, said second open portion configured to receive a second fastener having a second diameter different that the first diameter of said first fastener;

wherein said first open portion and said second open portion overlap to form a gap therebetween that is smaller than either the first diameter or the second diameter.

2. The electrical terminal according to claim 1, wherein said body has a threaded hole extending through said body and intersecting with said first opening, and a threaded screw received in said threaded hole for securing the electrical conductor in said first opening and forming an electrical connection.

3. The electrical terminal according to claim 2, wherein said body has a top face where said threaded hole is formed in said top face, said body having a leg with a top face spaced from said top face of said body where said first opening is open to said top face of said leg, said first opening having a bottom surface spaced from said top face of said leg to form a ledge between said first opening and said top face of said leg.

4. The electrical terminal according to claim 1, wherein said second opening in said body has an inwardly extending projection between said first open portion and said second open portion.

5. The electrical terminal according to claim 1, wherein said second open portion has a first side with a first projection extending inwardly and positioned between said first open portion and said second open portion, and a second side with a second projection extending inwardly and positioned between first open portion and said second open portion.

6. The electrical terminal according to claim 5, wherein said first projection and said second projection are spaced apart to define a gap having a width less than the inner dimension of said first open portion and less than the inner dimension of said second open portion.

7. The electrical terminal according to claim 6, wherein said first open portion has a substantially circular shape and said second open portion has a substantially circular shape.

8. The electrical terminal according to claim 1, wherein said body has a top face, a bottom face, and an end face, wherein said first opening extends through said end face, and said second opening extends between said top face and bottom face.

9. An electrical terminal comprising:

a body configured for coupling to an electrical conductor, said body having a leg with a top face and a bottom face, an opening having a first open portion extending between said top face and said bottom face and configured for receiving a first fastener for connecting said body to an electrically conducting member, and a second open portion extending between said top face and said bottom face and configured for receiving a second fastener, wherein said second open portion has an inner dimension greater than an inner dimension of said first open portion, and wherein said second fastener has an outer diameter greater than an outer diameter of said first fastener;

wherein said first open portion and said second open portion overlap to form a gap therebetween that is smaller than the inner dimension of the first open portion.

10. The electrical terminal according to claim 9, wherein said body comprises a first opening with an inner dimension to receive the electrical conductor, and a threaded screw hole extending through said body to said first opening, and a threaded screw received in said threaded screw hole for securing said electrical conductor in said first opening and forming an electrical connection.

11. The electrical terminal according to claim 10, wherein said top face of said leg is spaced from a top face of said body where said first opening is open to said top face of said leg, said first opening having a bottom surface spaced from said top face of said leg toward a bottom face of said body to form a ledge between said first opening and said top face of said leg.

12. The electrical terminal according to claim 9, wherein said second open portion has a first side with a first projection extending inwardly and positioned between said first open portion and said second open portion, and a second side with a second projection extending inwardly and positioned between first open portion and said second open portion.

13. The electrical terminal device of claim 12, wherein said first projection and said second projection are spaced apart to define a gap having a width less than the inner dimension of said first open portion and less than the inner dimension of said second open portion.

14. The electrical terminal of claim 13, wherein said first open portion has a substantially circular shape and said second open portion has a substantially circular shape.

15. The electrical terminal device of claim 9, wherein said body has a top face, a bottom face, and an end face, wherein said first opening extends through said end face, and said second opening extends between said top face and bottom face.

16. An electrical assembly comprising;

an electrically conductive member;

an electrical terminal having a body with a hole with a first open portion with a first inner dimension to receive a first threaded fastener having a first outer diameter, and a second open portion with a second inner dimension greater than said first inner dimension to receive a second threaded fastener having a second outer diameter greater than said first outer diameter, said electrical terminal coupled to said electrically conductive member by one of said first threaded fastener extending through said first open portion and received in a threaded hole having a first dimension complementing said first threaded fastener or a second threaded fastener extending though said second open portion and received in a threaded hole having a dimension complementing said second threaded fastener;

wherein said first open portion and said second open portion overlap to form a gap therebetween that is smaller than the first inner dimension.

17. The electrical assembly of claim 16, wherein said body has an opening for receiving an electrical conductor, wherein said body has a threaded hole extending through said body and intersecting with said opening, and a threaded screw received in said threaded hole for securing the electrical conductor in said opening and forming an electrical connection.

18. The electrical assembly of claim 16, wherein said second open portion has a first side with a first projection extending inwardly and positioned between said first open portion and said second open portion, and a second side with a second projection extending inwardly and positioned between said first open portion and said second open portion.

19. The electrical assembly of claim 18, wherein said first projection and said second projection are spaced apart to define a gap having a width less than the inner dimension of said first open portion and less than the inner dimension of said second open portion.

20. The electrical assembly of claim 19, wherein said first open portion has a substantially circular shape and said second open portion has a substantially circular shape.

* * * * *